US008548837B2

(12) United States Patent
Ahern et al.

(10) Patent No.: US 8,548,837 B2
(45) Date of Patent: Oct. 1, 2013

(54) E-BUSINESS VALUE WEB

(75) Inventors: Marybeth Ahern, Oak Hill, VA (US); Michael J. Law, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 2065 days.

(21) Appl. No.: 10/643,987

(22) Filed: Aug. 20, 2003

(65) Prior Publication Data
US 2005/0043977 A1 Feb. 24, 2005

(51) Int. Cl.
*G06Q 10/00* (2012.01)

(52) U.S. Cl.
USPC .......................... 705/7.12; 705/7.39; 705/7.24

(58) Field of Classification Search
USPC .................................. 705/7, 7.39, 7.12, 7.24
See application file for complete search history.

(56) References Cited

U.S. PATENT DOCUMENTS

| | | | |
|---|---|---|---|
| 5,689,711 A | 11/1997 | Bardasz et al. | |
| 5,819,270 A | 10/1998 | Malone et al. | |
| 6,115,691 A * | 9/2000 | Ulwick | 705/7 |
| 6,393,406 B1 * | 5/2002 | Eder | 705/7 |
| 6,411,936 B1 * | 6/2002 | Sanders | 705/10 |
| 6,442,557 B1 * | 8/2002 | Buteau et al. | 707/102 |
| 6,546,544 B1 | 4/2003 | Kawakami | |
| 6,546,545 B1 * | 4/2003 | Honarvar et al. | 717/100 |
| 6,708,327 B1 | 3/2004 | Aliphas | |
| 6,904,449 B1 | 6/2005 | Quinones | |
| 7,035,786 B1 | 4/2006 | Abu El Ata et al. | |
| 7,162,427 B1 * | 1/2007 | Myrick et al. | 705/1 |
| 7,752,070 B2 | 7/2010 | Hatcher et al. | |
| 7,937,281 B2 * | 5/2011 | Miller et al. | 705/7.12 |
| 2001/0034686 A1 * | 10/2001 | Eder | 705/36 |
| 2001/0053991 A1 * | 12/2001 | Bonabeau | 705/7 |
| 2002/0026370 A1 | 2/2002 | Tasler | |
| 2002/0046071 A1 | 4/2002 | Walker et al. | |
| 2002/0194578 A1 | 12/2002 | Irie et al. | |
| 2002/0198727 A1 * | 12/2002 | Ann et al. | 705/1 |
| 2003/0033586 A1 | 2/2003 | Lawler | |
| 2003/0046130 A1 * | 3/2003 | Golightly et al. | 705/7 |
| 2003/0088456 A1 * | 5/2003 | Ernest et al. | 705/10 |
| 2003/0110482 A1 | 6/2003 | Ferguson et al. | |

(Continued)

OTHER PUBLICATIONS

Patankar, Ajit K. and Sadashiv Adiga. "Enterprise Integration Modelling: A Review of Theory and Practice." Computer Integrated Manufacturing Systems: vol. 8, No. 1 (1995). pp. 21-34.*

(Continued)

*Primary Examiner* — Jonathan G Sterrett
*Assistant Examiner* — Stephen S Swartz
(74) *Attorney, Agent, or Firm* — Matthew Chung; Roberts Mlotowski Safran & Cole, P.C.

(57) ABSTRACT

A method and system is provided to manage and track changes in enterprise architectures. The invention provides a hierarchical visual management tool to manage and update relational information within an enterprise in a controlled fashion. The relationship may be maintained in a database and displayed via graphical user interface. Enterprise assets are categorized into such categories as goals, customer values or requirements, capabilities, resources, and the like. A hierarchy is constructed so that relationships between these various categories are identified and captured using the invention. Weights may be assigned to each element of the categories so that any proposed change to an enterprise architecture may be viewed so that a value can be ascertained and compared between other values of other proposed changes. In this manner, tracking and management of evolutionary changes to an architecture may be accomplished using relational information.

30 Claims, 8 Drawing Sheets

(56) References Cited

U.S. PATENT DOCUMENTS

| | | | |
|---|---|---|---|
| 2003/0120533 A1* | 6/2003 | Popillo et al. | 705/9 |
| 2003/0158800 A1* | 8/2003 | Pisello et al. | 705/35 |
| 2003/0172145 A1* | 9/2003 | Nguyen | 709/223 |
| 2003/0187707 A1* | 10/2003 | Hack et al. | 705/7 |
| 2003/0208468 A1 | 11/2003 | McNab et al. | |
| 2004/0002883 A1* | 1/2004 | Andrews et al. | 705/8 |
| 2004/0006566 A1 | 1/2004 | Taylor et al. | |
| 2004/0034552 A1* | 2/2004 | Cole et al. | 705/7 |
| 2004/0039619 A1* | 2/2004 | Zarb | 705/7 |
| 2004/0059611 A1* | 3/2004 | Kananghinis et al. | 705/7 |
| 2004/0059619 A1 | 3/2004 | Swedberg et al. | |
| 2004/0068431 A1* | 4/2004 | Smith et al. | 705/10 |
| 2004/0139095 A1 | 7/2004 | Trastour et al. | |
| 2004/0148566 A1* | 7/2004 | Jaffar et al. | 715/503 |
| 2004/0225591 A1 | 11/2004 | Chiappetta et al. | |
| 2004/0254806 A1* | 12/2004 | Schwerin-Wenzel et al. | 705/1 |
| 2005/0086091 A1* | 4/2005 | Trumbly et al. | 705/7 |
| 2005/0171753 A1 | 8/2005 | Rosing et al. | |
| 2007/0276674 A1* | 11/2007 | Hemmat | 705/1 |
| 2008/0235069 A1 | 9/2008 | Chiappetta et al. | |
| 2008/0243720 A1 | 10/2008 | Chiappetta et al. | |
| 2012/0158633 A1 | 6/2012 | Eder | |

OTHER PUBLICATIONS

Buchanan, Richard D. and Richard Mark Soley. "Aligning Enterprise Architecture and IT Investments with Corporate Goals." OMG Whitepaper (2002).*

Rood, Melody A. "Enterprise Architecture: Definition, Content, and Utility." IEEE (1994).*

Boster, Mark, et al. "Getting the Most from Your Enterprise Architecture." IT Pro (2000).*

Chalmeta, Ricardo, et al. "References Architectures for Enterprise Integration." The Journal of Systems and Software: vol. 57 (2001). pp. 175-191.*

Malhotra, Yogesh. "Enterprise Architecture: An Overview." BRINST Institute (1996).*

Armour, Frank J., et al. "Building an Enterprise Architecture Step by Step." IT Pro (1999).*

Armour, Frank J., et al. "A Big-Picture Look at Enterprise Architectures." IT Pro (1999).*

Kosanke, K., et al. "CIMOSA: Enterprise Engineering and Integration." Computers in Industry: vol. 40 (1999). pp. 83-97.*

Beznosov, Konstantin. "Information Enterprise Architectures: Problems and Perspectives." Florida International University School of Comptuer Science Technical Report (2000).*

Zachman, John A. "Enterprise Architecture: The Issue of the Century." Zachman International (1996).*

Fox, Mark S., and Michael Gruninger, "Enterprise Modeling." AI Magazine, 19:3 (1998), pp. 109-121.*

Yu, Eric, "Strategic Modelling for Enterprise Integration." Proceedings of the 14th World Congress of the International Federation of Automatic Control (Jul. 5-9, 1999).*

Richard D. Buchanan and Richard Mark Soley, "Aligning Enterprise Architecture and IT Investments with Corporate Goals." OMG and Metagroup Whitepaper (2002).*

Ulrich Frank, "Multi-Perspective Enterprise Modeling (MEMO)—Conceptual Framework and Modeling Languages." Proceedings of the 35th Annual Hawaii International Conference on System Sciences (2002).*

RD n439 Nov. 2000 Article 140 pp. 2023-2026 Wilks, Ed.; Baron, R.; Harris, C.; Ross, M.; Vouzzo, M.; *"IBM Standard Software Installer (ISSI)"*.

Office Action dated Sep. 4, 2012 in U.S. Appl. No. 13/479,407.

Office Action dated Jul. 26, 2012 in U.S. Appl. No. 13/471,867.

Final Office Action dated Dec. 20, 2012 in U.S. Appl. No. 13/471,867, 20 pages.

Final Office Action dated Feb. 1, 2013 in U.S. Appl. No. 13/479,407, 29 pages.

Office Action dated May 9, 2013 in U.S. Appl. No. 13/471,867, 23 pages.

Office Action dated May 28, 2013 in U.S. Appl. No. 13/479,407, 28 pages.

Triantafillou, et al., "Towards High Performance Peer-to-Peer Content and Resource Sharing Systems", Proceedings of the 2003 CIDR Conference, 12 pages.

* cited by examiner

US 8,548,837 B2

E-BUSINESS VALUE WEB

This invention was made with government support under the terms of contract number TCS0994 awarded by the Department of Defense. The government has certain rights in the invention.

BACKGROUND OF THE INVENTION

1. Field of the Invention

The invention generally relates to an enterprise management support system and, more particularly, to a decision-making system to evaluate enterprise decisions.

2. Background Description

In the decision making process for evolutionary changes and modifications to an enterprise, few tools and automation capabilities exist to quantify the enterprise elements (including software and hardware system functionality, business processes and workforce capabilities) of evolutionary changes. The ability to identify and monitor these elements provides an organization an overview of their total capabilities and supporting resources; in effect, it defines an organization's business model. Through the linkage of the business model to the organization's vision, mission and goals, an organization can draw a strategic linkage from what they are chartered to do, right down to the people, process and technology resources that they need to have to complete their mission.

Currently, if an organization would like to determine whether a strategic return on investment resides in a selected solution alternative, information from a number of sources would have to be gathered, accuracy determined, and then a cost/benefit analysis performed. There is currently no known application that can align and track capabilities and resources across an entire organization in this fashion.

SUMMARY OF THE INVENTION

In an aspect of the invention, a method is provided for determining a value provided by an enhancement to an enterprise architecture. The method includes the steps of defining at least one customer requirement for the enhancement, identifying at least one capability to provide the enhancement to the enterprise architecture, estimating at least one of a revenue increase and a cost saving associated with the at least one capability, and determining a value provided by the at least one capability based upon an implementation cost and the at least one of the revenue increase and the cost saving.

In another aspect of the invention, a method for providing a service for tracking and managing an evolutionary change to an enterprise is provided. The method includes the steps of establishing at least one goal for establishing an endpoint of the evolutionary change, associating one or more values that define requirements of the evolutionary change with the at last one goal, affiliating with the one or more values one or more strategic capabilities that represent functions that must be present to support the one or more values. Further included is the step of identifying one or more resources that represent enterprise components with the one or more strategic capabilities, and hierarchically maintaining relationships of the at least one goal, the one or more values, the one or more strategic capabilities and the one or more resources.

In another aspect of the invention a method for tracking and managing changes is provided. The method includes the steps of identifying a new enterprise asset to an enterprise architecture, identifying one or more defined capabilities associated with the new enterprise asset, and identifying one or more new resources that satisfy the one or more defined capabilities. Further included are the steps of implementing the one or more defined capabilities and one or more new resources, and tracking the one or more defined capabilities and one or more new resources based on assigned performance based metrics.

In another aspect of the invention, a system for determining a value provided by an enhancement to an enterprise architecture is provided. The system includes a component to define at least one customer requirement for the enhancement, a component to identify at least one capability to provide the enhancement to the enterprise architecture, a component to estimate at least one of a revenue increase and a cost saving associated with the at least one capability, and a component to determine a value provided by the at least one capability based upon the implementation cost and the at least one of a revenue increase and the cost saving.

In another aspect of the invention, a system for providing a service for tracking and managing an evolutionary change to an enterprise is provided. The system includes a component to establish at least one goal for establishing an endpoint of the evolutionary change, a component to associate one or more values that define requirements of the evolutionary change with the at last one goal, a component to affiliate with the one or more values and one or more strategic capabilities that represent functions that must be present to support the one or more values. Further included is a component to identify one or more resources that represent enterprise components with the one or more strategic capabilities, wherein the relationship of the at least one goal, the one or more values, the one or more strategic capabilities and the one or more resources are hierarchically maintained to provide tracking and managing capabilities of the evolutionary change.

In another aspect of the invention, a computer program product is provided comprising a computer usable medium having readable program code embodied in the medium and includes a first computer code to define at least one customer requirement for the enhancement, a second computer code to identify at least one capability to provide the enhancement to the enterprise architecture, a third computer code to estimate at least one of a revenue increase and a cost saving associated with the at least one capability, and a fourth computer code to determine a value provided by the at least one capability based upon the implementation cost and the at least one of a revenue increase and the cost saving.

BRIEF DESCRIPTION OF THE DRAWINGS

The foregoing and other objects, aspects and advantages will be better understood from the following detailed description of embodiments of the invention with reference to the drawings, in which.

DETAILED DESCRIPTION OF EMBODIMENTS OF THE INVENTION

This invention is directed to an e-Business Value Web (eBVW). Generally, the invention provides a hierarchical visual management tool to manage and update relational information within an enterprise in a controlled fashion. The relationship of the information is maintained in a database as additions and modifications are made so that the hierarchical relationship is accurately maintained at each level. The relational information may be used to manage and evaluate an evolutionary change to the enterprise. The evolutionary change may include any change in enterprise operation or an enterprise architecture and may include one or more of its products.

The invention includes a web application management tool that provides for illustrating and quantifying the value of transforming an enterprise business model from its current "as-is" state to a proposed "to-be" business model. Or, said differently, from one state to another state. Alternative transformation quantifications, i.e., alternative "to be" models, may be projected for comparison. The invention provides a stable business model that identifies, with text and graphics via a front end GUI, the value of one or more proposed solutions, the capabilities the transformed "to be" enterprise will deliver, and the resources to support those capabilities.

The eBVW acts as a robust management and decision support system that provides a "view" of transformation potential. This application tracks the alignment of the current operational environment with alternatives that provide the best value for the customer organization and customer base. The eBVW may present a solution to integrating the people, process and technology resources of the organization with the current and future business strategies.

The invention further provides a decision making tool to help an organization focus its efforts on issues that will directly affect the completion of its mission via a streamlined process by capturing and displaying all of the current resources that an organization has and how they relate to the organization's mission, in a near real-time fashion. The eBVW maintains the relationships between an organization's value to its customers, the capabilities the organization has to support its values, and the resources that provide those capabilities. In this manner, an organization can directly track which resources (e.g., people, process, or technology) directly support specific capabilities to provide the customer with a unique value.

Value Web Constructs

Figure 1:
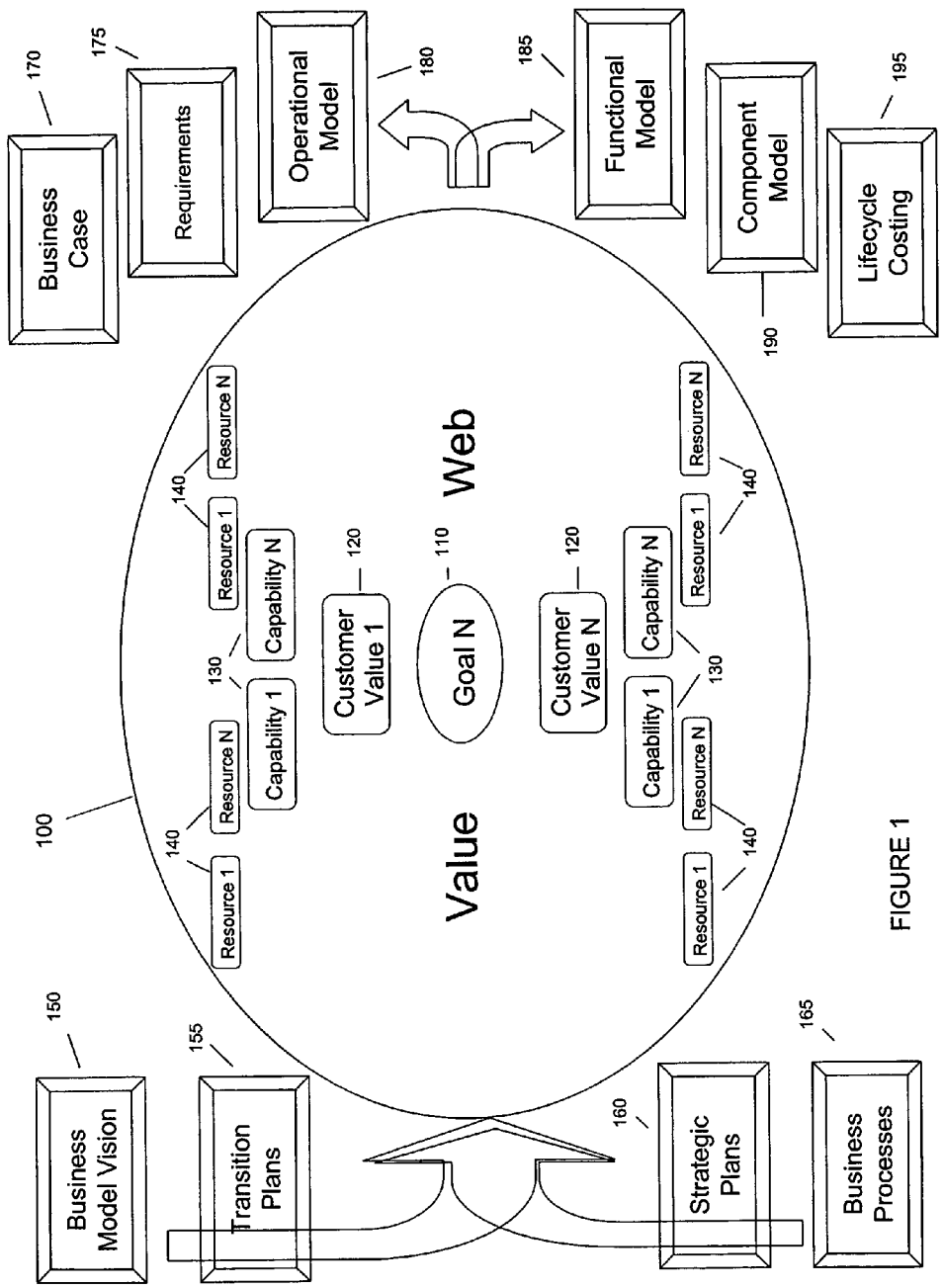
FIG. 1 is an illustrative diagram showing the relational components of the invention.

FIG. 1 is an illustrative diagram showing the relational components of the invention, generally denoted as reference numeral 100 and includes the components in the Value Web oval. The invention partitions information relevant to enterprise decision making for evolutionary enhancements by creating categories of information and relating these categories to one another by a methodical construction and providing an automated system to manage these categories of information.

The hierarchical relational components of the value tree illustrated in FIG. 1 includes a depiction of one Goal N 110 and associated hierarchical information (e.g., Value Element 120, Strategic Capability 130, Resources 140, etc.). It should be understood that the Goal and associated information is one illustrative example implementing the invention, and that any number of Goals and associated hierarchical information may be provided by the invention. For each Goal N 110, one or more lower layers of the hierarchy may be present as necessary. The Value Web tree of FIG. 1 includes the following, for illustration:

Mission

The Mission (not shown) of the organization is the definition of what the organization is striving for currently. Both the vision and the mission are defined and validated through traditional methods of strategic planning within the organization. An example of a mission is: To provide direct support for our customers in their business processes.

Goals

A Goal 110 includes the Corporate Directive derived from either a Mission statement or a Strategic Plan and generally provides and establishes a final end point of an enterprise change. They tend to be a further decomposition of the mission of the organization. There may be any number of Goals (1 to N) constructed. An example of a Goal is: Our workforce will consist of the premier e-Business consultants in the industry.

Customer Values

The Customer Values 120 (Value) represents the requirements, wants and needs that the enterprise will bring to the stakeholders. A Customer Value is typically identified by an enterprise customer or by the enterprise itself. A Goal may have any number of Value elements (1 to N) defined or identified and associated with the Goal. Here there may be a many-to-many relationship between the Customer Values and the Goals. In other words, there are many Customer Values per Goal and Customer Values could belong to multiple Goals. An example of a Customer Value is: Provide time savings for procurement through web-based transactions.

Strategic Capabilities

The Strategic Capabilities 130 (Capabilities or Capability enablers) contained in the Value Web represent critical functions that the organization must be capable of doing well to insure the delivery of the ideal, defined Customer Values (targeted customer wants/needs), and fulfilling its own strategic Goals. A Customer Value 120 may include or have affiliated any number of Strategic Capabilities (1 to N), and have a many-to-many relationship with the Customer values. An example of a strategic capability is: A web portal that provides one-stop shopping for all of an organization's procurement.

Operational Resources

The Operational Resources 140 (Resources) document the physical components that must be present to enable the Capabilities to deliver the value expressed in the Value Elements 120. The Strategic Capabilities 130 are supported by one or more Operational Resources 140, and include categories of enterprise components, for example, business processes, personnel skills/competencies, workforce skills, physical entities, information technology or system components, and data, knowledge or information. A Strategic Capability 130 may include any number of Operational Resources (1 to N) 140 and likewise has a many-to-many relationship with the Strategic Capabilities 130. An example of an operational resource is: A specific type of web-server to run the internet portal.

Value Web Integration Points with Life Cycle Applications

The invention provides interfacing and insertion of other life cycle support information that may exist in an enterprise into the enterprise business model. These include the following as further depicted in FIG. 1.

Business Model Vision

The Value Web provides the physical and relational depiction of an organization's Business Model Vision 150. Traditionally, a business model depicts the company's vision, mission and goals, and how it plans to operate in its market environment. It is often enough to provide guidance for analysis and alignment of any functional area of a company, including, for example, information technology (I/T), and to provide prioritization criteria for initiatives, programs, projects and even modules of a technology package. This is because good vision, mission, goal statements usually identify a future view, a description of types of offerings and customers, and the means to achieve the desired outcome.

In practice, value propositions, required capabilities and key resources to enable a capability are replacing the use of traditional strategic concepts of Critical Success Factors and Distinctive Competencies. With this in view, the required capabilities, goals and customer values from the Business Model are downloaded to the Value Web database and then accessed during the life cycle via the Value Web application.

Strategic Plans

The Goals 110 are captured from the organization's Strategic plans 160 which typically are detailed documented plans that describe the actions of an organization in a current or future period to achieve its business objectives, and are defined in the Value Web database, or linked to the database, which can then be accessed via the Value Web application. If a new goal is added then appropriate Value Web Customer Values, Capabilities 130 and Resources 140 must also be in place to support the new goal. If the new goal does not have the strategic eBVW elements supporting it, then the application will prompt the user to identify the corresponding business processes, workforce skills or technologies. The eBVW will also prompt the user to validate the realignment or deletion of the values, capabilities, and resources when a goal is removed.

Requirements

The Requirements 175 are defined as the customer's wants and needs which are tied directly to the Strategic Capabilities 130 of the eBVW. These system, process or product/service requirements must be supported by at least one or more Strategic Capability 130. If a client formally gathers and maintains customer requests/requirements in another automated system, these requirements can be uploaded/downloaded (or entered) into the eBVW database and then accessed during the life cycle via the eBVW application.

Operational Model

The Operational Model 180 depicts the physical layout of the current "as is" and "to be" enterprise architecture. Each technology, process, or skill enabler can be traced back to a specific physical node or element, which gives the organizational executives (CEO, CIO, CFO) the ability to track functionality and flag specific capabilities that might not have adequate support.

Functional Model

The Functional Model 185 depicts the functions of the current and "to be" enterprise operations, skills, and architecture. Each Resource 140 can be traced back to a specific functional element, which then can be matched to specific requirements.

Component Model

The Component Model 190 depicts the functional components of the current and "to be" enterprise architecture. Each resource can be traced back to a specific component element, which then can be matched to specific requirements.

Business Processes

The Business Processes 165 are defined/known methods and procedures in the enterprise for carrying out its strategic plans and operations. A complete inventory of the "as is" processes and "to be" processes are maintained in the application as Operational Resources 140. These are directly tied to a specific Strategic Capability 130, or multiple Strategic Capabilities 130. Managers can view a Strategic Capability 130 and then see which processes support it, or what process changes are needed to support it. Process Measurements from external process modeling tools can be captured and linked to the eBVW database so that process performance can be accessed during the life cycle via the eBVW application. New processes may come into being through normal course of business operations and often impact future planning of the enterprise.

Transition Plan

The Transition Plan 155 is a defined overall approach in the organization to be taken to implement a new capability or enhancement. eBVW supports more complete and accurate planning for improvements or new capabilities because it clearly identifies all existing ("as-is") processes, systems, and skills that support a current capability and those required to achieve the future state. Transitioning and Implementation Plans define the overall approach that an organization will take to implement a new capability or enhance performance against an existing capability. Each Strategic Capability defined within a transition plan must also have a supporting capability on the eBVW.

Lifecycle Costing

Lifecycle Costing 195 typically includes costs/expenses for client labor, consulting, training, hardware and infrastructure, hardware maintenance, software licensing, software maintenance, and post implementation components. Each cost element can be traced to one or more Strategic Capability 130 of the eBVW. This enables Business Managers to project the high-level summary of "hard" or quantifiable benefits such as total project benefits ($), total project expenditures ($), internal rate of return (%), net present value ($) and discounted payback period (years). Lifecycle costs can be downloaded to the eBVW database and then accessed during the lifecycle via the eBVW application. Alternative decisions may be made base on the costing.

Business Case

The Business Case 170 documents and quantifies the benefits, costs, schedules and assumptions required to justify the implementation of the Transformation project recommendations. The eBVW plays a key role in the development of the Business Case 170 by giving the designer a tool in which he/she can access multiple key elements needed in creating the Business Case 170.

Using e-Business Value Web (eBVW)

eBVW provides a management tool to support the decisions of corporate and mission operations and provides the ability to track the enterprise capabilities that are required to satisfy the customer's values in alignment with the organization's goals. However, in order for the eBVW to provide flexible practical utility, it is possible to assign weights to the eBVW's different components to assign a relative priority among the components. Through the weighting and prioritization of elements, the capabilities of precedence can be assigned higher weights, thus being given consideration before less value-adding capabilities. Some of the eBVW capabilities support the following generally known business activities in a methodical manner:

- Acting as a medium for enterprise discussion and decision.
- Supporting program management, quality, CMMI (Capability Maturity Model Integration).
- Representing dependencies at the enterprise level.
- Identifying the "critical nodes" where resources are affected.
- Driving business case analysis and resolution (value, cost, lost opportunity cost, ROI, etc.) by defining the value contribution.

Facilitating comparison of the Transition Plan's deployment of capabilities vs. the delivery of the projected future capabilities.

Providing a context for investment decisions and technology forecasting.

Providing detailed information to support more robust Transition Planning when a new capability is implemented.

Identifying new or improved customer requirements and customer wants and needs.

The eBVW serves as an integrating framework for defining and measuring how current and future capabilities directly support an organization's Vision and Mission. The process of implementing new and innovative capabilities implies that many various aspects of systems engineering often necessitates interaction. The eBVW lies in the middle of this process, as a checkpoint to provide visibility whether the new "to be" capabilities will add value to the overall enterprise and to what degree such value is added. The process for incorporating a new capability into the operational environment is outlined and may include:

Allocating customer requirements to capabilities in the eBVW.

Mapping requirements to capabilities.

Identifying new capabilities from changes to goals, business processes, workforce skills or technology, and drive requirement changes.

Inserting technology which provides resources to meeting capabilities or may create new capabilities.

Decomposing eBVW Customer Mission/goals/requirements into customer values/capabilities/resources.

Defining measures (i.e., metrics to gauge performance) for each resource's contribution to value.

Assigning weights to each node's contribution to its parent node's value.

Estimating qualitative value to the Customer Values for comparing options may be done.

Selecting capabilities for delivery based on optimum value to the Customer Values and allocated for development.

Establishing Capabilities and metrics for measuring implementation.

Modeling and simulation techniques are used to predict measures expected for each resource.

Measuring relative impact by eBVW to estimate value or benefit against the organizations Strategic objectives.

Testing may verify capabilities and requirements are satisfied and provide collected metrics for modeling and simulation.

FIGS. 2A-2D show embodiments of a graphical user interface (GUI), generally denoted by reference numeral 200, for illustrating the provisioning of the features of the invention as discussed above. Other forms of the GUI may exist as one of ordinary skill in the art would recognize. The GUI and supporting operational control programming logic of the invention may be implemented on various computer platforms and may include various types of database systems to provide for data store and retrieval associated with the ongoing implementation and use of the invention. The computer platform may be interconnected with various local area networks (LANS) and the Internet for access and use. The eBVW may be implemented in any reasonably accommodating computer language such as "C", "C++", or Java.

Figure 2A:
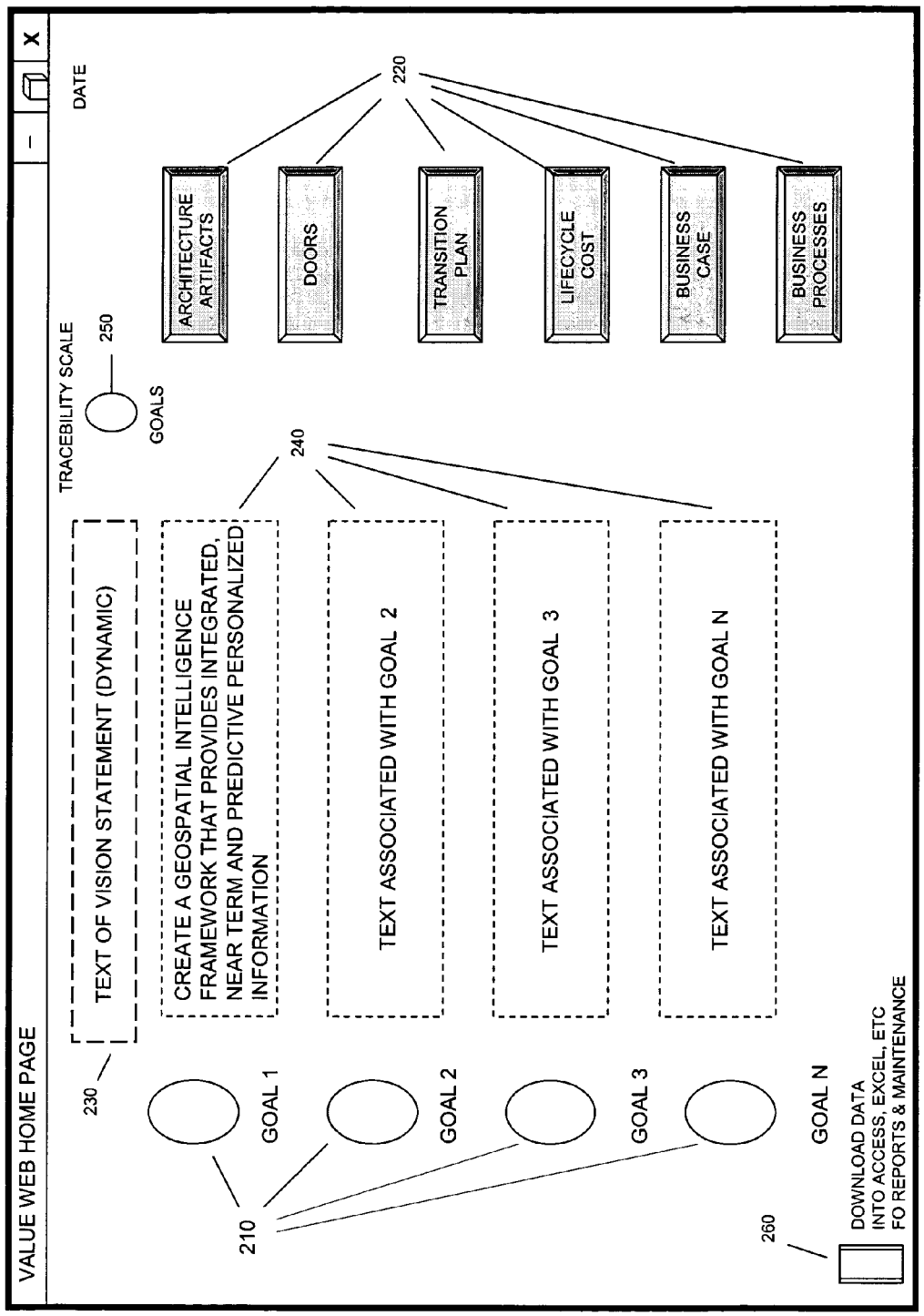
FIGS. 2A-2D show embodiments of a graphical user interface, according to the invention.

By way of example, the GUI of FIG. 2A depicts the eBVW Home Page according to the invention that provides a convenient way to view the information contained and managed by the eVBW database hierarchy by providing a visual representation of the hierarchy and permitting traversal of the hierarchy. By way of example, the GUI provides a user with point and click capability for Goals 1-N (210), which has a definition field associated with each Goal button 210, and various dynamic links 220 to various other operational elements of the eBVW such as, for example, architecture artifacts, DOORS (i.e., a known systems requirement management tool), transition plan 155, lifecycle cost, business case 170, and business processes 165. These dynamic links may also link any of the life cycle support information (e.g., FIG. 1, items 150-195) into the eBVW, as necessary. In embodiments, other dynamic links may be presented such as, for example, financial planning tools, forecasting tools, or the like. Also provided is a visual presentation of the associated Vision statement 230 that provides an overall business purpose for the goal. An explanatory field 240 is associated with the point and click buttons, e.g., 210.

The eBVW Home page also provides for a Traceability Scale 250 that shows the level of the eBVW currently being viewed within the eBVW hierarchy. The Tracebility Scale shows lineage of relationships of one eBVW element to others. The Traceability Scale permits the user to move up and down the hierarchy as desired by selecting the level they want to view, for example, by point and click for forward and backward functionality. A download capability 260 provides for downloading data into other database formats for maintenance purposes and reports. The components of the Value Tree are manipulated by the invention via the GUI and supporting software logic and are maintained in logical hierarchical relationship in a database for updating and monitoring.

Figure 2B:
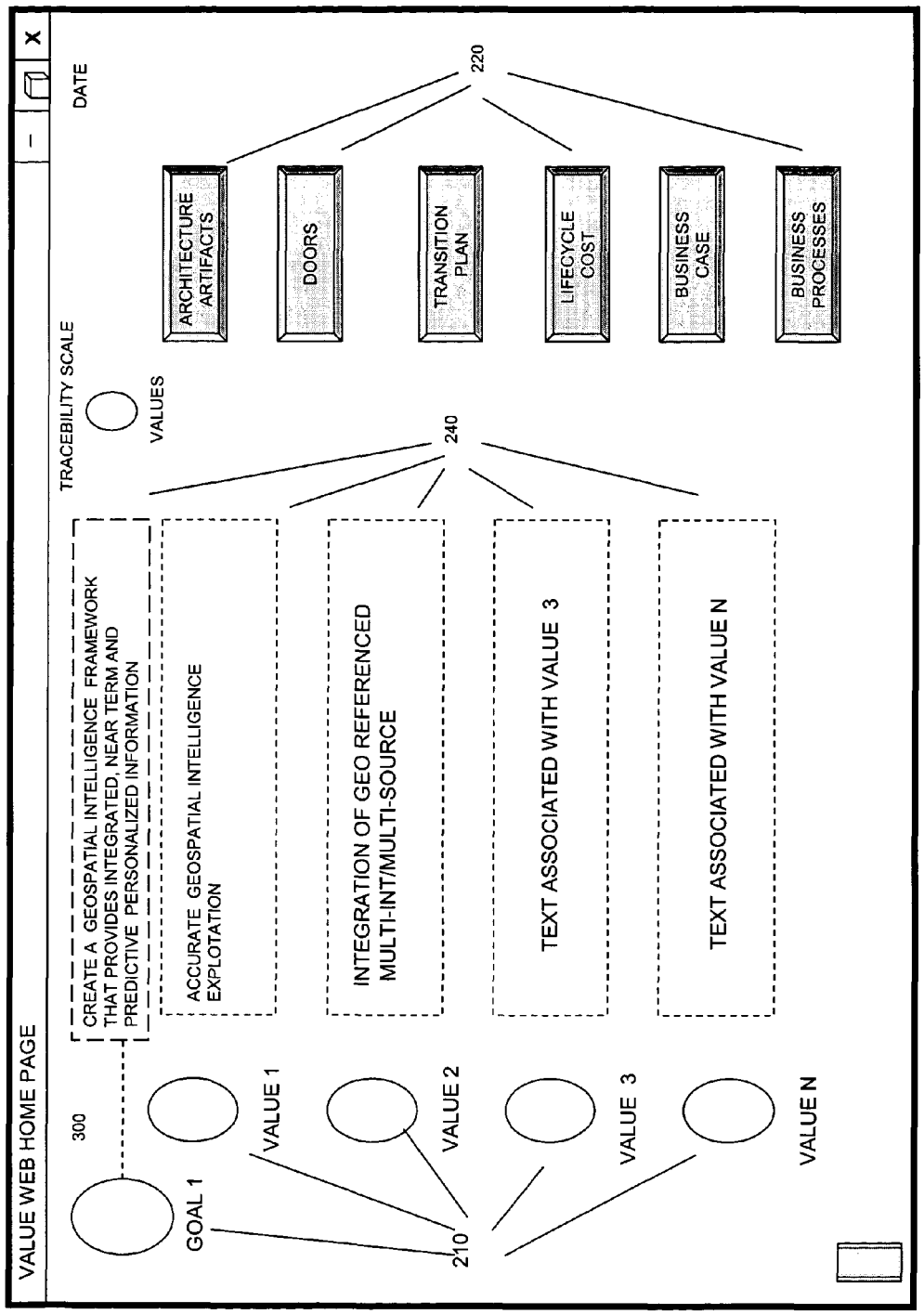
Figure 2C:
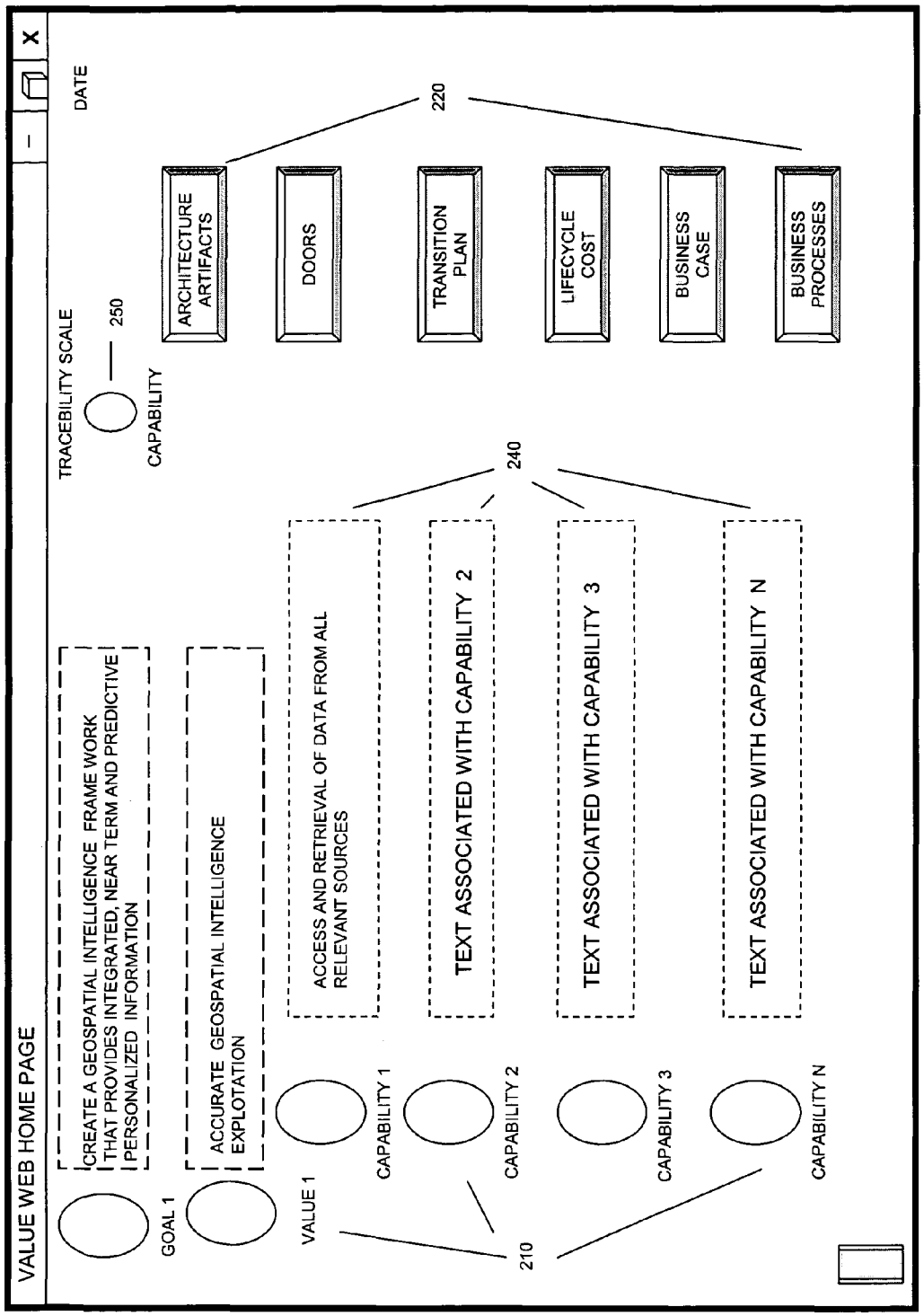

FIG. 2B depicts a lower level selection for Goal 1 (i.e., Goal 1 button was selected) and the associated Customer Values 1-N. Each Customer Value entry has an explanatory field. Similar levels exist for all Goals 1-N. The dynamic links 220 are still provided as necessary, but may be different links as necessary. Since Goal 1 was selected from FIG. 2A, the next layer within the eBVW hierarchy associated with Goal 1 is now displayed, in this example, Values 1-N. The Values 1-N each have an associated text field 240 that defines each Value 1-N. The Traceability Scale 250 has been updated to reflect that the user is viewing the VALUES level. In this fashion, the hierarchical nature of eBVW is visually displayed FIG. 2C depicts another lower level of the eBVW, in particular, for Strategic Capabilities (Capability) 1, i.e., Customer Value (Value 1 button selected) 1 was selected on FIG. 2B. The tree structure of the eBVW may be maintained as shown, i.e., Goal 1 and Value 1 along with the typical other features such as the dynamic links 220. Capabilities 1-N are shown along associated buttons 210 with associated definitions 240 of each Capability 1-N. The Traceability Scale 250 has also been updated to reflect that the user is viewing the Goals level.

Figure 2D:
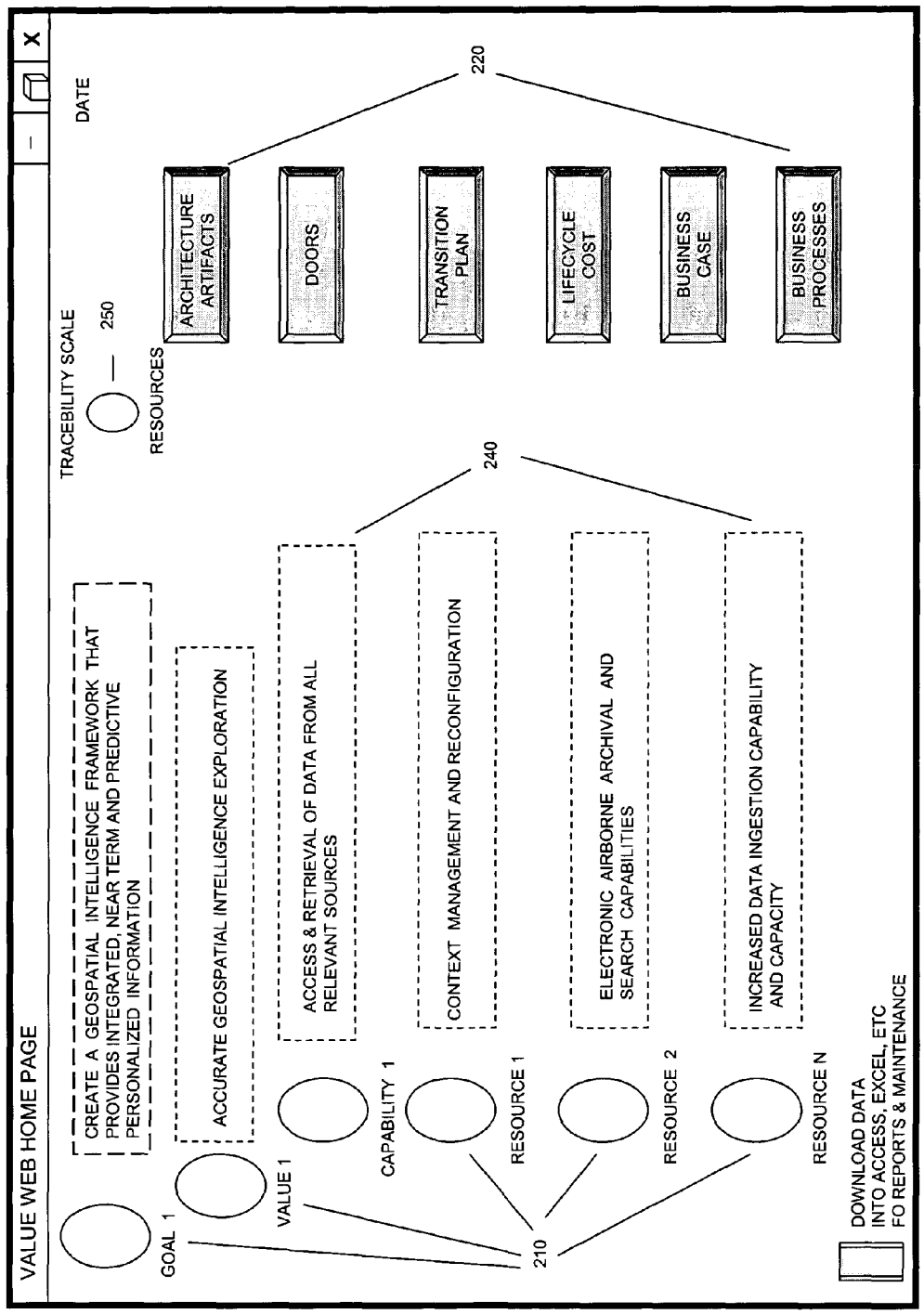

FIG. 2D depicts the next lower level of the eBVW, in particular, for Operational Resources (Resources) for Strategic Capability 1(Capability 1) button selected on FIG. 2C. Again an associated description 240 for each Operational Resource button, along with the buttons (i.e., Goal 1, Value 1, and Capability 1) that lead to this position in the hierarchy is provided. A user may easily move directly to any of the previous levels by activating the displayed buttons (e.g., Goal 1, Value 1, and Capability 1). Dynamic links 220 are available as necessary and may even be tailored according to the Traceability Scale 250. That is, this level may have different dynamic links from the previous levels. The hierarchical tree is maintained for the user's visual relational comprehension. The Traceability Scale 250 has also been updated with the proper level, i.e., Resources. At each level, a database download is available via button 260.

As can be seen by the exemplary Value Home Page of FIGS. 2A-2D, the invention provides a hierarchical visual management tool to manage and update relational information within an enterprise in a controlled fashion. The relationship of the information is maintained in a database as additions and modifications are made so that the hierarchical relationship is accurately maintained at each level. Updates to the hierarchy are stored to a eBVW database dynamically as changes are made. A project scheduling package may be employed to relate the elements of each level to an enterprise schedule for tracking and management purposes.

When adding a new Strategic Capability under control of the invention the Requirements may be updated to ensure that a contribution is identified for the added value when the new Strategic Capability is requested. The Strategic Capability eventually may be implemented (e.g., designed and developed) in proper fashion so that any Operational Resources used to provide the Strategic Capability are included with value in mind, as tracked and managed by the invention. Following design and development stages, under the umbrella controls of the invention, integration and testing may be conducted under a prototype environment, for example, in order to gauge the value the capability might contribute towards the Customer Vision through predicted metrics.

The eBVW may then be utilized to transition the Strategic Capability into actual operations. The metrics provided by the invention enables real insight to the value that the new Strategic Capability may bring to the enterprise when it is fully functional in an operational environment.

The eBVW may also be incorporated into the Operations and Maintenance (O&M) processes to ensure the Strategic Capability may be sustainable well into the future. Hence, the invention supplies comprehensive lifecycle management support by integrating multiple facets of components of the lifecycle into a unified cost/value/benefit management tool.

Figure 3:
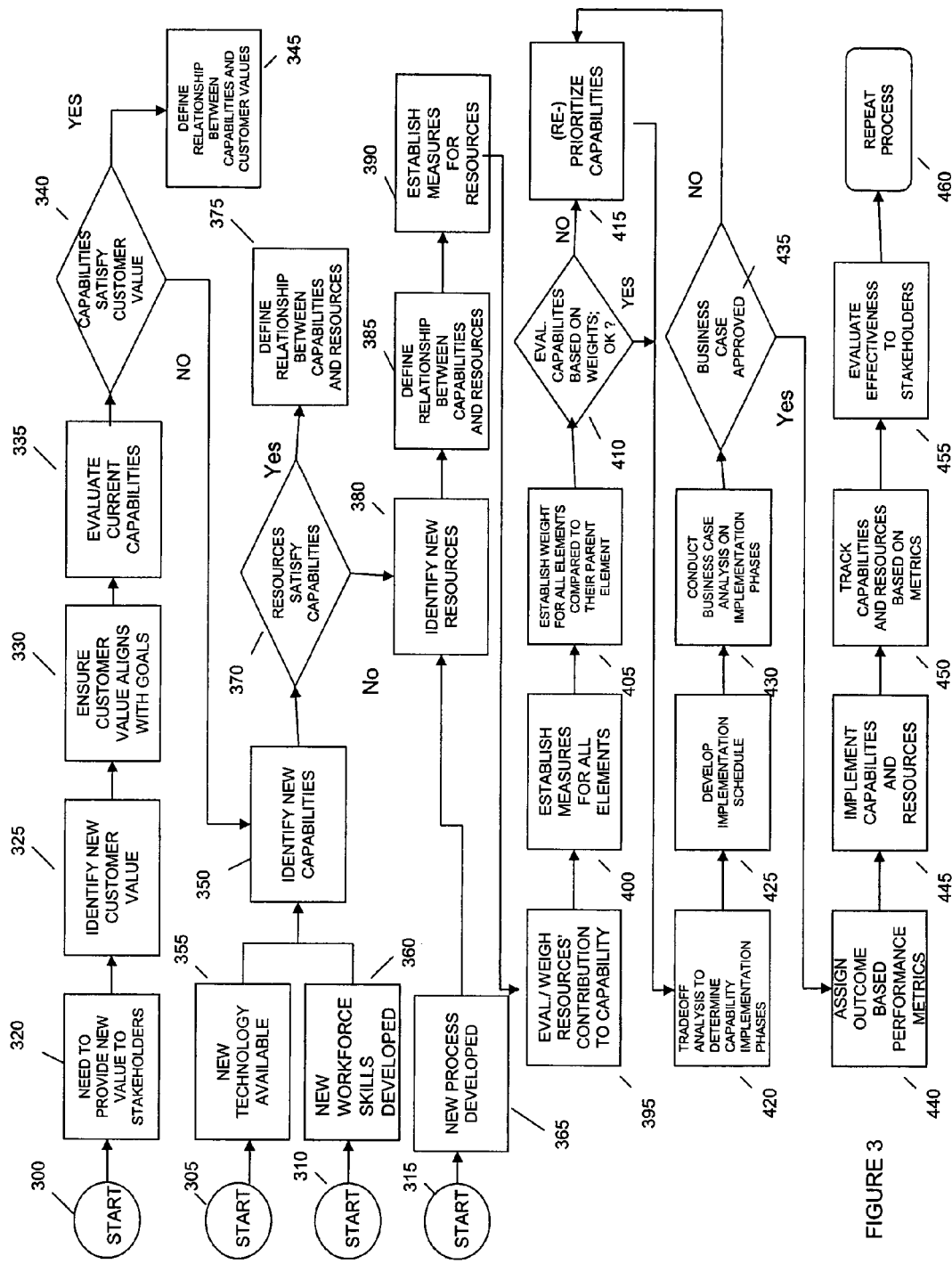
FIG. 3 is a flow chart showing steps of an embodiment for using the invention.
Figure 4:
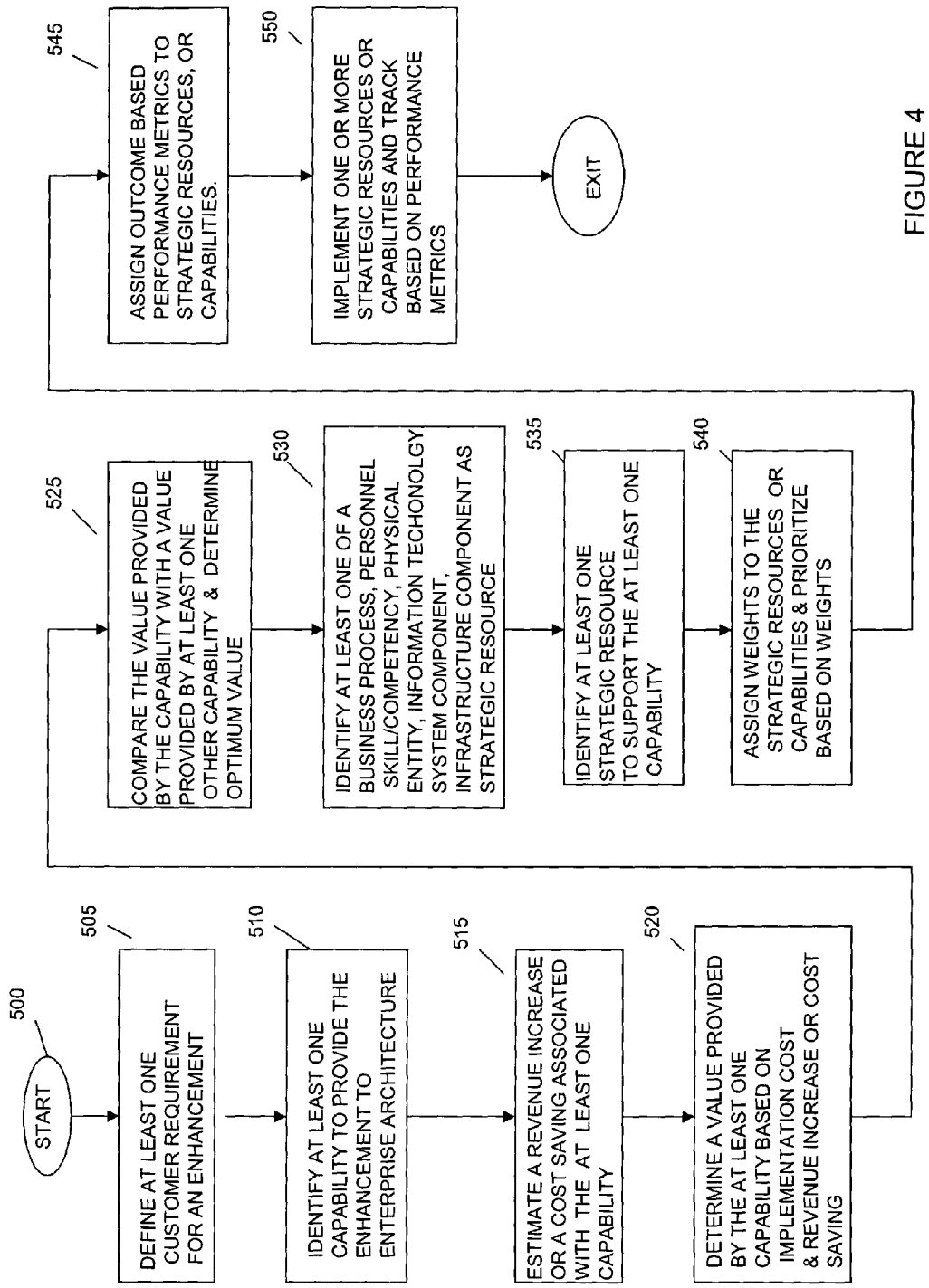
FIG. 4 is a flow chart showing steps of an embodiment for using the invention.
Figure 5:
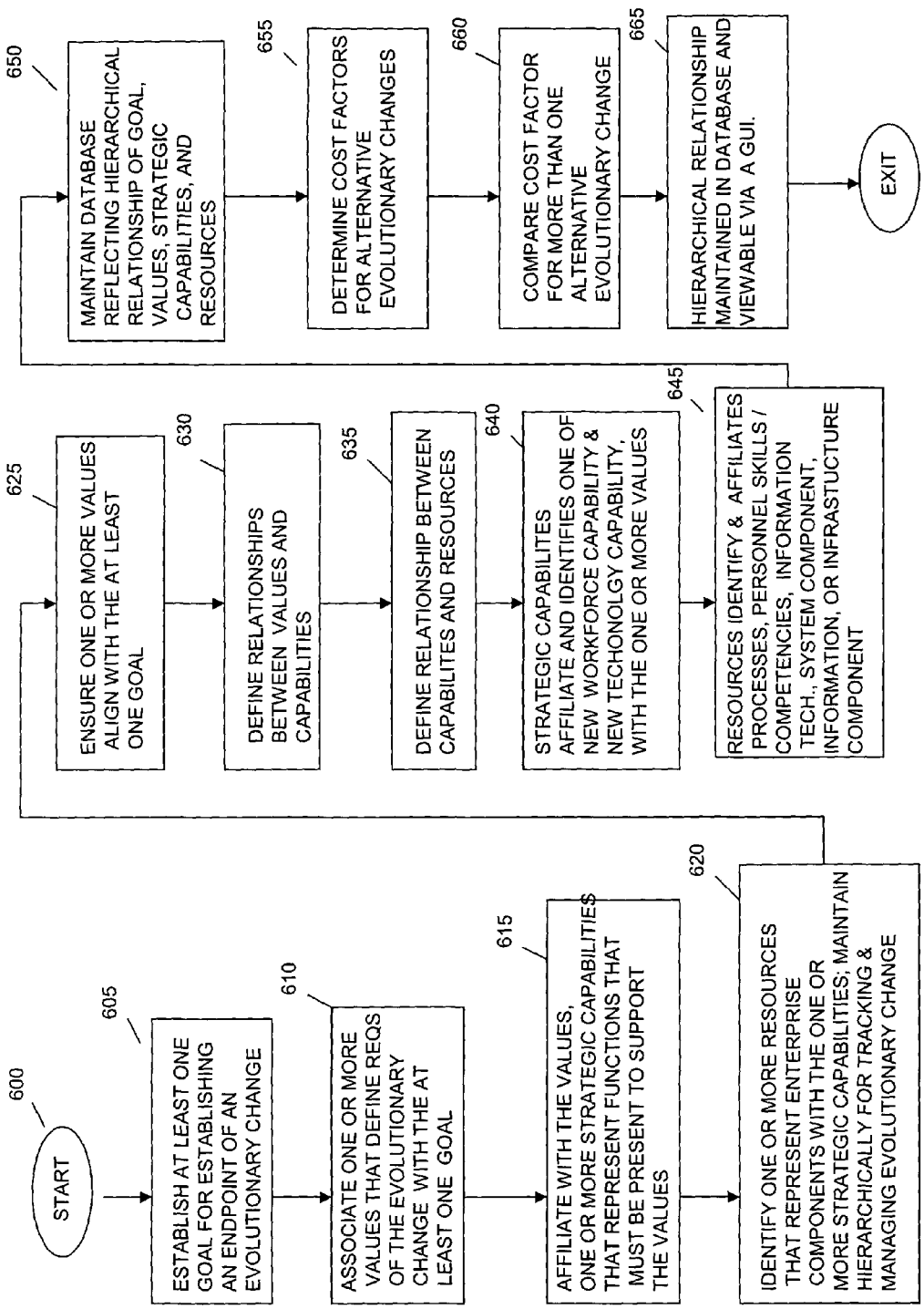
FIG. 5 is a flow chart showing steps of an embodiment for using the invention.

FIG. 3 is a flow diagram showing steps of embodiments of using the invention. FIGS. 3 (and FIGS. 4 and 5) may equally represent a high-level block diagram of components of the invention implementing the steps thereof. The steps of FIGS. 3-5 may be implemented on computer program code in combination with the appropriate hardware. This computer program code may be stored on storage media such as a diskette, hard disk, CD-ROM, DVD-ROM or tape, as well as a memory storage device or collection of memory storage devices such as read- only memory (ROM) or random access memory (RAM). Additionally, the computer program code can be transferred to a workstation over the Internet or some other type of network. FIGS. 3-5 may be substantially implemented via the GUI of FIGS. 2A-2D and associated software, computer platform and databases.

The process and steps shown in FIG. 3 may provide for a service for managing and planning an evolutionary change to an enterprise. This may include any portion of a product or service such as, for example, hardware or software system or corresponding architecture and components thereof. Costs and resources can be projected to weigh alternatives or to evaluate one value/requirement over another in order to make decisions and choices based on contributing factors such as, for example, implementation costs, a revenue increase or cost saving.

There are four alternative starting points in the flow of FIG. 3: 300, 305, 310, and 315. These entry points permit managing various enterprise assets such as, for example, a new customer value, new technology, new workforce skills, or new process. Beginning with starting point 300, at step 320, there is a perceived need to provide a new value to stakeholders of an enterprise or operation. At step 325, a new Customer Value is identified. At step 330, a verification occurs to determine that the new Customer Value aligns with the enterprise goals. At step 335, current Capabilities are evaluated to determine if current Capabilities are sufficient for supporting the new Customer Value. At step 340, a decision is made whether the current Capabilities satisfy the Customer Value. If yes, then at step 345, the relationships between the Capabilities and Customer Value are defined. If no, however, at step 350, new Capabilities are identified to support and satisfy the new Customer Value.

At step 370, a check is made whether available Resources satisfy the new Capabilities. If yes, then at step 375, the relationships between Capabilities and Resources are defined. If no, at step 380, new Resources are identified to satisfy the newly identified Capability. At step 385, the relationship is defined between Capabilities and the Resources. At step 390, new measures and metrics are established for the Resources. Assignment of other weights may occur as well, particularly if step 400 is not performed. At step 395, the Resources' contributions to the Capability are each weighed or evaluated. At step 400, measures are established for all elements including the Resources, if necessary, if not previously established in step 390. At step 405, weights are established for all elements compared to parent elements. This may be an assignment of a numeric value to each element within the eBVW hierarchy. The weights may be maintained by the eBVW software in the eBVW database. At step 410, Capabilities are evaluated based on the weights and if the priorities are deemed correct proceeds with step 420, otherwise, at step 415, a prioritization occurs of the Capabilities.

At step 420, a tradeoff analysis may be conducted to determine Capability implementation phases. For example, costs, time factors, benefits, etc. associated with each element are examined and tradeoff decisions made. At step 425, an implementation schedule may be developed to forecast the timing, and decisions of the tradeoff analysis. At step 430, a business case analysis on implementation phases may be conducted. This provides priorities of the tradeoff analysis and determines which phases are implemented in what order, etc. A business case analysis may compare alternatives at different levels of focus including the total cost factors for portions or an entire proposed evolutionary change. At step 435, a decision is made to approve the business case. If not, then a re-prioritization is undertaken at step 415. If yes, then at step 440, an outcome-based performance metrics is assigned. At step 445, the capabilities and resources are implemented and tracked based on metrics, such as, for example, costs and time, or other established targeted goals. At step 450, the Capabilities and Resources are tracked based on the metrics. At step 455, effectiveness to the enterprise stakeholders is evaluated as necessary to assure compliance and awareness and to assure that the needs and expectations have met with the decisions of the business case analysis and implementation results. At step 460, the process may be repeated as necessary to continually manage and oversee an enterprise operation.

Alternate entry at 305 provides for the recognition of new technology. At step 355, new technology is made available or recognized as potentially available. The process continues at step 350 above. Alternate entry at step 310 deals with new workforce skills. At step 360, new workforce skills are developed, acquired or recognized. The process continues with step 350. Alternate entry at step 315 deals with new processes. At step 365, new processes are developed, acquired or recognized. The process then continues with step 380.

FIG. 4 is a flow diagram showing steps of an embodiment of using the invention beginning at 500. At step 505, at least one requirement is defined for an enhancement to the enterprise architecture. The requirement may be defined in response to a request by customer. For example, this may be an enhancement to a process, a feature, a hardware architecture, a software architecture, or the like. At step 510, at least one capability, which may be a current or new capability, is identified to provide the enhancement to the enterprise architecture. At step 515, a revenue increase or a cost saving associated with the at least one capability is estimated.

At step 520, a value is determined as provided by the at least one capability based on implementation cost and revenue increase or cost saving. The value is typically denoted in monetary terms, but may be in terms of strategic business worth, or the like. At step 525, the value provided by the capability is compared to a value provided by at least one other capability and an optimum value is determined. At step 530, at least one of a business process, personnel skill/competency, physical entity, information technology, system component, and infrastructure component is identified as a strategic resource. At step 535, at least one strategic resource is identified to support the at least one capability.

At step 540, weights are assigned to the strategic resources or capabilities and prioritized based on such weights. At step 545, outcome based performance metrics are assigned to strategic resources or capabilities. At step 550, one or more strategic resources or capabilities are implemented and are tracked based on performance metrics. Performance metrics may be defined and tested through several manners including, for example, conducting facilitated working sessions, or by building simulation models for business Process or Technology Resource Enablers. Estimates may be entered and recorded and subsequently modified as additional real performance information is observed. The process exits.

FIG. 5 is a flow diagram showing steps of an embodiment of the invention, starting at 600. At step 605, at least one goal is established which establishes an endpoint of an evolutionary change. At step 610, one or more values that define requirements of the evolutionary change are associated with the at least one goal. At step 615, one or more strategic capabilities that represent functions that must be present to support the values are affiliated with the values. At step 620, one or more resources are identified that represent enterprise components with the one or more strategic capabilities. The hierarchical relationships are maintained for the goals, values, capabilities, and resources for tracking and managing the evolutionary change.

At step 625, a review is performed to ensure that one or more values align with the at least one goal. At step 630, relationships between the values and capabilities are defined. At step 635, relationships between the capabilities and resources are defined. At step 640, strategic capabilities affiliate and identify a new workforce capability or new technology capability with the one or more values. At step 645, resources identify and affiliate process, personnel skills/competencies, information technology, system component, or infrastructure component.

At step 650, a database is maintained reflecting the hierarchical relationship of the goal(s), value(s), strategic capabilities, and resource(s), as needed. At step 655, cost factors are determined for alternative evolutionary changes by choosing and comparing various sets of Goals, Values, Capabilities and/or Resources and weighing the benefits. At step 660, cost factors are compared for more than one alternative evolutionary change. At step 665, the hierarchical relationships (i.e., goal, value, strategic capability, resource, etc.) are maintained in a database and the hierarchy is viewable and modifiable via a GUI.

As thus discussed, the eBVW provides a comprehensive tool for managing enterprise operations for evolutionary or revolutionary (i.e., incremental or transformational) change decisions. The enterprise, or portions thereof, may be represented in a hierarchical fashion by defining the elements involved in the processes, capabilities and resources of the enterprise. Projecting the effects of an evolutionary change may be accomplished by analyzing alternative choices for optimal benefits.

While the invention has been described in terms of embodiments, those skilled in the art will recognize that the invention can be practiced with modifications and in the spirit and scope of the appended claims.

What is claimed is:

1. A method for managing and tracking changes in an organization, the method comprising the steps of:
   providing a web based application management tool implemented in a processor and operable to illustrate and quantify a value of transforming an enterprise business model from a current "as-is" state to a proposed "to-be" state;
   capturing and displaying current resources of the organization and how they relate to an organizations' mission in real-time;
   directly tracking which specific current resources directly support which current capabilities of the organization;
   defining at least one customer requirement for an enhancement to an enterprise architecture of the organization, wherein implementation of the enhancement transforms the enterprise business model to the proposed "to-be" state;
   evaluating the current capabilities to determine whether at least one of the current capabilities is sufficient to provide the enhancement to the enterprise architecture;
   when at least one of the current capabilities is not sufficient to provide the enhancement, identifying at least one new capability that is sufficient to provide the enhancement;
   determining whether at least one of the current resources of the organization satisfy the at least one new capability;
   when at least one of the current resources satisfy the at least one new capability, defining a relationship with the web based application management tool between the at least one current resource and the at least one new capability, wherein the defining the relationship comprises:
      defining one or more metrics to gauge performance for each of the at least one current resource's contributions to the at least one new capability; and
      assigning weights to each of the at least one current resource's contributions to the at least one new capability;
   estimating at least one of a revenue increase and a cost saving associated with implementation of the at least one new capability to provide the enhancement and achieve the proposed "to-be" state;
   determining a value provided by the at least one new capability based upon the defined one or more metrics, the assigned weights for each of the at least one current resource's contributions, an implementation cost,and the at least one of the revenue increase and the cost saving;
   projecting an alternative value based upon implementation cost and at least one of revenue increase and cost saving for at least one alternative combination of at least one capability and at least one resource that are sufficient to provide the enhancement to the enterprise architecture, wherein the alternative value is further based on one or more metrics and assigned weights for the at least one resource's contributions to the at least one capability;

comparing a value of the current "as-is" state of the enterprise business model to the value and the alternative value of the proposed "to-be" state of the enterprise business model for implementation of the enhancement to determine an optimum qualitative value;

choosing to stay with the current "as is" state, adopt the value of the proposed "to-be" state, or adopt the alternative value of the proposed "to-be" state based on which option is determined to provide the optimum qualitative value;

using a database to store a hierarchical relationship of a goal, the value of the current "as-is" state, the value of the proposed "to-be" state, the alternative value of the "to-be" state, the current capabilities, the at least one new capability, current resources of the organization, and the at least one of the current resource, the hierarchical relationship having a plurality of levels with one or more dynamic links that differ between the plurality of levels;

displaying the hierarchical relationship between the goal, the values which are associated with the goal, the current capabilities and the at least one new capability, which represent critical functions for ensuring delivery of the values, and the current and at least one current resource, which enable the current capabilities and the at least one new capability;

capturing and linking process measurements from one or more external modeling tools to the database to allow process performance of the chosen current "as-is" state or proposed "to-be" state to be accessed by the system: and updating the hierarchical relationship to include a hierarchical relationship between the at least one capability and the at least one resource that comprise the option determined to provide the optimum qualitative value, wherein the determining the value and alternative value of the proposed "to-be" state comprises illustrating and quantifying the value of transforming the enterprise business model of the organization from the current "as-is" state to the proposed "to-be" state; and the goal is defined as a corporate directive establishing a final end point of an enterprise change, the value and alternative value of the proposed "to-be" state are defined as a customer value, the at least one new capability is a strategic capability that represents critical functions that the organization must be capable of performing to insure delivery of the customer value, and the at least one current resource is defined as a physical component that must be present and supports the at least one new capability.

2. The method of claim 1, further comprising the step of mapping the at least one customer requirement to the at least one new capability.

3. The method of claim 1, wherein the determining whether the at least one of the current resources of the organization satisfy the at least one new capability includes identifying the at least one of the current resources to support the at least one new capability.

4. The method of claim 3, wherein the identifying the at least one new capability includes identifying at least one of a business process, a personnel skill/competency, a physical entity, an information technology, a system component, and an infrastructure component.

5. The method of claim 3, further comprising prioritizing each of the at least one current resource based on the assigned weights.

6. The method of claim 3, wherein the defined one or more metrics are outcome based performance metrics to the at least one current resource.

7. The method of claim 6, further comprising the step of implementing the at least one current resource and tracking the at least one current resource based on the outcome based performance metrics.

8. The method of claim 1, further comprising the steps of:
assigning a weight to the at least one new capability; and
prioritizing the at least one new capability based on the assigned weight.

9. The method of claim 1, further comprising the steps of:
assigning outcome based performance metrics to the at least one new capability; and
implementing the at least one new capability and tracking the at least one new capability based on the outcome based performance metrics.

10. A system comprising hardware and software for managing and tracking changes in an organization, the system comprising:

a web based application management tool operable to illustrate and quantify a value of transforming an enterprise business model from a current "as-is" state to a proposed "to-be" state, the web based application management tool being configured to:

capture and display current resources of the organization and how they relate to an organizations' mission in real-time;

directly track which specific current resources directly support which current capabilities of the organization;

define at least one customer requirement for an enhancement to an enterprise architecture of the organization, wherein implementation of the enhancement transforms the enterprise business model to the proposed "to-be" state;

evaluate the current capabilities to determine whether at least one of the current capabilities is sufficient to provide the enhancement to the enterprise architecture;

when at least one of the current capabilities is not sufficient to provide the enhancement, identify at least one new capability that is sufficient to provide the enhancement;

determine whether at least one of the current resources of the organization satisfy the at least one new capability;

when at least one of the current resources satisfy the at least one new capability, define a relationship between the at least one current resource and the at least one new capability, wherein the defining the relationship comprises:

defining one or more metrics to gauge performance for each of the at least one current resource's contributions to the at least one new capability; and assigning weights to each of the at least one current resource's contributions to the at least one new capability;

estimate at least one of a revenue increase and a cost saving associated with implantation of the at least one new capability to provide the enhancement and achieve the proposed "to-be" state;

determine a value provided by the at least one new capability based upon the defined one or more metrics, the assigned weights for each of the at least one current resource's contributions, the implementation cost, and the at least one of a revenue increase and the cost saving;

project an alternative value based upon implementation cost and at least one of revenue increase and cost saving for at least one alternative combination of at least one capability and at least one resource that are sufficient to provide the enhancement to the enterprise architecture, wherein the alternative value is further based on one or more metrics and assigned weights for the at least one resource's contributions to the at least one capability;

compare a value of the current "as-is" state of the enterprise business model to the value and the alternative value of the proposed "to-be" state of the enterprise business model for implementation of the enhancement to determine an optimum qualitative value; and select the current "as is" state, the value of the proposed "to-be" state, or the alternative value of the proposed "to-be" state based on which option is determined to provide the optimum qualitative value;

a database configured to store a hierarchical relationship of a goal, the value of the current "as-is" state, the value of the proposed "to-be" state, the alternative value of the "to-be" state, the current capabilities, the at least one new capability, current resources of the organization, and the at least one of the current resource, the hierarchical relationship having a plurality of levels with one or more dynamic links that differ between the plurality of levels; and a graphic user interface (GUI) configured to display the hierarchical relationship between the goal, the values which are associated with the goal, the current capabilities and the at least one new capability, which represent critical functions for ensuring delivery of the values, and the current and at least one current resource, which enable the current capabilities and the at least one new capability, wherein the web based application management tool is further operable to: capture and link process measurements from one or more external modeling tools to the database to allow process performance of the chosen current "as-is" state or proposed "to-be" state to be accessed by the system; and update the hierarchical relationship to include a hierarchical relationship between the at least one capability and the at least one resource that comprise the option determined to provide the optimum qualitative value;

the determining the value and alternative value of the proposed "to-be" state comprises illustrating and quantifying the value of transforming the enterprise business model of the organization from the current "as-is" state to the proposed "to-be" state; and the goal is defined as a corporate directive establishing a final end point of an enterprise change, the value and alternative value of the proposed "to-be" state are defined as a customer value, the at least one new capability is a strategic capability that represents critical functions that the organization must be capable of performing to insure delivery of the customer value, and the at least one current resource is defined as a physical component that must be present and supports the at least one new capability.

11. The system of claim 10, wherein the web based application management tool is further configured to map the at least one customer requirement to the at least one new capability.

12. The system of claim 10, wherein the enterprise architecture includes at least one of a hardware architecture and a software architecture.

13. The system of claim 10, wherein the identifying the at least one new capability includes identifying at least one of a business process, a personnel skill/competency, a physical entity, an information technology, a system component, and an infrastructure component.

14. The system of claim 13, wherein the web based application management tool is further configured to prioritize each of the at least one current resource based on the assigned weights.

15. The system of claim 13, wherein the defined one or more metrics are outcome based performance metrics to the at least one current resource.

16. The system of claim 15, wherein the web based application management tool is further configured to track the at least one current resource based on the outcome based performance metrics.

17. The system of claim 10, wherein the web based application management tool is further configured to:
assign a weight to the at least one new capability; and
prioritize the at least one new capability based on the assigned weight.

18. The system of claim 10, wherein the web based application management tool is further configured to assign outcome based performance metrics to the at least one new capability.

19. A computer program product usable for managing and tracking changes in an organization and comprising a computer readable storage medium having readable program code embodied in the storage medium, the computer program product includes at least one component operable to:
illustrate and quantify a value of transforming an enterprise business model from a current "as-is" state to a proposed "to-be" state;
capture and display current resources of the organization and how they relate to an organizations' mission in real-time;
directly track which specific current resources directly support which current capabilities of the organization;
define at least one customer requirement for an enhancement to an enterprise architecture of the organization, wherein implementation of the enhancement transforms the enterprise business model to the proposed "to-be" state;
evaluate the current capabilities to determine whether at least one of the current capabilities is sufficient to provide the enhancement to the enterprise architecture;
when at least one of the current capabilities is not sufficient to provide the enhancement, identify at least one new capability that is sufficient to provide the enhancement;
determining whether at least one of the current resources of the organization satisfy the at least one new capability;
when at least one of the current resources satisfy the at least one new capability, define a relationship between the at least one current resource and the at least one new capability, wherein the defining the relationship comprises:
defining one or more metrics to gauge performance for each of the at least one current resource's contributions to the at least one new capability; and assigning weights to each of the at least one current resource's contributions to the at least one new capability;

estimate at least one of a revenue increase and a cost saving associated with implementation of the at least one new capability to provide the enhancement and achieve the proposed "to-be" state;

determine iteratively a qualitative value provided by the at least one new capability for various options of the proposed "to-be" state of the enterprise business model comprising different combinations of the at least one current resource based upon the defined one or more metrics and the assigned weights for each of the at least one current resource's contributions to the at least one new capability, the implementation cost, and the at least one of a revenue increase and the cost saving;

compare a qualitative value of the current "as-is" state of the enterprise business model to the determined qualitative values for various options of the proposed "to-be" state of the enterprise business model for implementation of the enhancement to determine an optimum qualitative value;

select the current "as is" state or one of the options of the various options of the proposed "to-be" state of the enterprise business model based on which option is determined to provide the optimum qualitative value;

store in a database a hierarchical relationship of a goal, the qualitative value of the current "as-is" state, the qualitative values for the various options of the proposed "to-be" state, the current capabilities, the at least one new capability, current resources of the organization, and the at least one of the current resource, the hierarchical relationship having a plurality of levels with one or more dynamic links that differ between the plurality of levels;

capture and link process measurements from one or more external modeling tools to the database to allow process performance of the selected current "as-is" state or proposed "to-be" state to be accessed;

updating the hierarchical relationship to include a hierarchical relationship between the at least one capability and the at least one resource that comprise the option determined to provide the optimum qualitative value; and display on a graphic user interface (GUI) the hierarchical relationship between the goal, the values which are associated with the goal, the current capabilities and the at least one new capability, which represent critical functions for ensuring delivery of the values, and the current and at least one current resource, which enable the current capabilities and the at least one new capability, wherein the determining iteratively the qualitative values for the various options comprises illustrating and quantifying the qualitative value of transforming the enterprise business model of the organization from the current "as-is" state to the proposed "to-be" state; and the goal is defined as a corporate directive establishing a final end point of an enterprise change, the qualitative values for the various options are defined as a customer value, the at least one new capability is a strategic capability that represents critical functions that the organization must be capable of doing to insure delivery of the customer value, and the at least one current resource is defined as a physical component that must be present and supports the at least one new capability.

20. The method of claim 1, wherein the at least one customer requirement is defined in response to a request by a customer.

21. The method of claim 20, wherein the value is monetary or in terms of strategic business worth.

22. The method of claim 21, wherein the defined one or more metrics are defined and tested by conducting facilitated working sessions or building simulation models.

23. The method of claim 22, wherein the estimates are at least one of entered, recorded, or modified as additional real performance information is observed.

24. The method of claim 1, further comprising allowing at least one organizational executive to track functionality and flag one or more of the at least one new capability.

25. The method of claim 8, further comprising using the assigned weights to make a decision based on one or more of the implementation cost, the revenue increase, and the cost saving.

26. The method of claim 1, further comprising providing a user with a plurality of dynamic links to operational elements of the system, the plurality of dynamic links structured to link a business model vision, a transition plan, a strategic plan, a business process, a business case, the at least one new customer requirement, an operational model, a functional model, a component model, and a lifecycle costing to the system.

27. The method of claim 1, further comprising storing updates to the database dynamically as changes are made to the hierarchical relationship.

28. The method of claim 1, further comprising using the system to transition the at least one new capability into actual operations.

29. The method of claim 28, further comprising determining whether the at least one new capability supports and satisfies the customer value.

30. The method of claim 29, further comprising conducting a tradeoff analysis and a business case analysis, the tradeoff analysis being based on a cost, a time factor, and a benefit.

* * * * *